Patented Nov. 8, 1938

2,135,879

UNITED STATES PATENT OFFICE 2,135,879

PROCESS FOR OXIDIZING HYDROSULPHIDES

William H. Shiffler and Melvin M. Holm, Berkeley, Calif., assignors to Standard Oil Company of California, San Francisco, Calif., a corporation of Delaware No Drawing. Application July 8, 1935, Serial No. 30,354

8 Claims. (Cl. 23—134)

This invention relates to a new and useful process for oxidizing hydrosulphide solutions and more particularly to a process wherein the oxidation may be controlled and directed to the production of single oxidation products as desired.

The use of a solution, commonly known as "lime-sulphur", which contains calcium pentasulphide ($CaS_5$) as the major active ingredient is well known in agricultural and horticultural pest control work.

Such solutions were until recently prepared by boiling an aqueous suspension of lime and elementary sulphur. Due to the nature of the reaction involved this method was wasteful of materials, as much as thirty percent of the lime and ten percent of the sulphur going to substantially valueless products.

W. H. Volck, in U. S. Patent No. 1,517,522 issued December 2, 1924, showed that in a reaction in which one-fifth of the sulphur is supplied by hydrogen sulphide the undesirable co-products of the former process can be eliminated and a substantial saving in materials can thus be effected. In an application, Serial Number 30,353, copending herewith we have disclosed and claimed a process whereby the pure hydrogen sulphide required in the foregoing Volck process may be derived from dilute and impure $H_2S$ bearing gases, and in particular from the by-product gases resulting from the industrial cracking of sulphur bearing petroleum oils for the production of motor fuels.

We have now discovered certain reactions wherein it is possible to direct and control the oxidation of hydrosulphides and thereby to derive the total sulphur required in the production of calcium pentasulphide of good quality directly from hydrogen sulphide. In connection with our above mentioned disclosure this discovery is of far-reaching economic importance in that the hitherto waste sulphur contained at considerable dilution in by-product gases of the petroleum industry may now be converted into a product of extensive utility.

It is the broad object of this invention to provide a process wherein the catalytic oxidation of sulphide sulphur may be controlled so as to yield substantially a single product as desired.

It is another object of this invention to provide a process in which hydrosulphide may be oxidized with air substantially quantitatively to pentasulphide.

It is a further object of our invention to provide a process whereby it is possible to produce calcium pentasulphide of desirable purity from lime, hydrogen sulphide and the oxygen of air.

Lime or calcium hydroxide suspended in water will absorb hydrogen sulphide at atmospheric temperature according to the following equation:

I. $Ca(OH)_2 + 2H_2S = Ca(HS)_2 + 2H_2O$

When such absorption of hydrogen sulphide is effected from a gas produced during the cracking of a sulphur containing petroleum oil organic sulphur compounds are simultaneously absorbed which give a very foul and disagreeable odor to the hydrosulphide solution. If not removed this odor persists in the products prepared from such solution and in the case of lime-sulphur for parasiticidal use, renders the product unmarketable.

It has been pointed out in our above-mentioned copending application that by boiling such a foul hydrosulphide solution until hydrogen sulphide is freely liberated the odor producing bodies may be entirely eliminated and a hydrosulphide solution suitable for any desired subsequent use may thus be derived from the most foul hydrogen sulphide containing petroleum gases.

When a calcium hydrosulphide solution is contacted with oxygen or air in the presence of suitable catalysts a part of the hydrosulphide sulphur is oxidized and pentasulphide is produced as indicated by the following equation:

II. $5Ca(HS)_2 + 4O_2 = 2CaS_5 + 3Ca(OH)_2 + 2H_2O$

In order for this reaction to find utility in the commercial production of calcium pentasulphide or lime-sulphur solution it is obviously necessary that substantially all of the hyrosulphide sulphur oxidized shall go to pentasulphide and not to some other of the several possible oxidation products. However when we first attempted to utilize this reaction for this purpose it was found that such a single oxidation was very far from being realized. In an attempt to discover conditions under which only the reaction as written (II) would take place attention was first given to the catalyst employed.

It has for some time been generally known that, in the regeneration of sodium hydrosulphide solutions resulting from the purification of city gas, nickel and iron sulphides will catalyze the oxidation of hydrosulphide sulphur by air to elementary so-called "flotation" sulphur. While there was no reason to expect that these particular metal sulphide catalysts could be made to oxidize hydrosulphide sulphur to pentasulphide as required for our purpose attention was first turned to the general group of water-insoluble metal sulphides in the hope that some one might be prepared with just the proper activity to effect the desired oxidation.

A large number of such sulphides were accordingly tested for their activity in catalyzing the oxidation of calcium hydrosulphide solutions by air without regard to the nature of the products produced. Nickel, arsenic, iron, cobalt, manganous, and cupric sulphides were thus indicated for further study. Having thus determined a group of materials possessing a catalytic activity sufficient to effect the oxidation of hydrosulphide at commercially practical rates attention could next be directed to the nature of the products of such oxidation.

Of the foregoing group arsenic and manganous sulphides were found to catalyze the oxidation of calcium hydrosulphide solution almost quantitatively to calcium thiosulphate. Numerous experiments were run in which the oxygen absorbed was converted 99% to thiosulphate. While this product was decidedly not the one sought the substantially quantitative oxidation of hydrosulphide to a single product was at least indicative that other catalysts and/or other conditions might result in a similar conversion to the desired product. The nickel, iron, cobalt and cupric sulphides, however, gave polysulphide, thiosulphate and sulphate in various ratios and none of them even approached giving polysulphide exclusively. The most favorable result was obtained with nickel which gave the foregoing three products in the ratio of 74:73:17.

In a series of attempts to improve upon this result it was discovered that the ratio in which the above oxidation products are produced is very largely influenced by the acidity or alkalinity of the solution undergoing oxidation and hence should be predeterminable. By reference to Equation II it is apparent that in order to maintain any given pH throughout the reaction means must be provided for controlling or preventing the production of calcium hydroxide. Further consideration of this equation suggested that if sufficient hydrogen sulphide were provided during the oxidation reaction calcium hydroxide should be used up as fast as formed, by reason of the reaction of Equation I. The net reaction would then be the sum of Equations I and II:

III. $2Ca(HS)_2 + 4O_2 + 6H_2S = 2CaS_5 + 8H_2O$

As a test of this possibility a solution of calcium hydrosulphide, containing 0.06% by weight of nickel sulphide in suspension as catalyst, was intimately contacted at room temperature and atmospheric pressure with air containing sufficient hydrogen sulphide that an appreciable concentration (0.1 to 1.0% or above) was always present in the exit gas from the apparatus. When the reaction had proceeded to the point at which oxygen absorption slowed appreciably and sulphur began to precipitate the solution was analyzed and hydrosulphide found to have been oxidized to pentasulphide and thiosulphate in the ratio of 97 to 3.4 with no measurable amount of sulphate formed.

Obviously then, with a source of pure hydrogen sulphide or with a gas containing hydrogen sulphide and no interfering substance, such a result would indicate the reaction of Equation III to be well suited to the commercial production of a desirable grade of lime-sulphur solution. Our previous invention, disclosed in the aforementioned copending application, having provided such a source of pure hydrogen sulphide the objects of the present invention could thus be fully realized.

In carrying out our process any convenient suspension or slurry of lime in water, for instance one containing from 5 to 20% by weight of lime, is intimately contacted at about atmospheric temperature with a source of hydrogen sulphide until substantially converted to hydrosulphide. This source may be either hydrogen sulphide which has been purified or it may be the crude gases from the pyrolytic distillation of petroleum. If the latter, the solution after reacting with hydrogen sulphide is boiled for a few minutes or until several percent of the contained sulphur is liberated as hydrogen sulphide and discarded. The solution after cooling is then provided with 0.02 to 0.10% of the appropriate metal sulphide catalyst and intimately contacted with air at atmospheric or higher temperature and pressure. When lime-sulphur is the desired product nickel sulphide may be employed as the catalyst and hydrogen sulphide should be incorporated with the air in sufficient excess that it is not completely utilized during the reaction and an appreciable concentration is therefore carried by the exit gas.

The presence of an excess of hydrogen sulphide throughout the oxidation stage of the reaction is apparently effective in directing the oxidation of hydrosulphide to pentasulphide by reason of the definitely fixed pH which it provides and hence especial precautions should be taken to insure against a deficiency. We prefer to provide the gas exit from the system with an automatic analyzer so connected as automatically to control the hydrogen sulphide introduced though other means may of course be provided for effecting the same result.

While it appears likely that maintaining the pH of the solution by any means whatever at the same value as given by saturation with $H_2S$ would equally well direct the oxidation of hydrosulphide to pentasulphide the advantages of using excess hydrogen sulphide for this purpose are so obvious that the consideration of other possible buffer systems for this purpose may be dispensed with for the present.

Having continued the oxidation until further absorption of oxygen results in the liberation of free sulphur the solution is then filtered to remove the catalyst and any impurities introduced with the lime, is finally neutralized with lime or reacted with lime and sulphur to remove the last trace of hydrosulphide and is diluted to the desired strength for use.

Since the preparation of pure hydrogen sulphide for use in the oxidation step will usually require an absorption, purification and regeneration system employing an alkaline absorption agent which is capable of easier and more complete regeneration than is a lime-suspension it may often be preferable to employ only the one system for absorbing hydrogen sulphide from the impure gas in which it is produced whereupon the preparation of hydrosulphide solution would be from pure gas and no purification step as described above would be necessary.

As disclosed in our aforesaid application any of the well known alkaline absorption agents such as diamino propanol, triethanol amine or sodium phenate solution are applicable to our method of preparing pure hydrogen sulphide and may be employed here as desired. In such case the alkaline absorption liquid is reacted with the impure hydrogen sulphide containing gas to the point of substantial saturation and is then boiled until hydrogen sulphide is freely evolved. The first fraction of gas liberated will carry the objectionable sulphur bodies and is accordingly segregated after which substantially pure hydrogen sulphide is evolved on further boiling and may be used in the hydrosulphide forming reaction and/or in the oxidation reaction as required. When the alkaline solution has thus been largely freed from hydrogen sulphide it is returned to the absorption stage for resaturation and the cycle is complete.

Still another modification of the procedure has been found possible and may under certain conditions prove advantageous. Instead of preparing free hydrogen sulphide for use in the oxidation step represented by Equation III it may be prepared in situ by means of the reaction between sulphur and hydrosulphide represented by the following equation:

$$Ca(HS)_2 + 4S = CaS_5 + H_2S$$

in which case sulphur would be added in controlled amount to the liquid undergoing oxidation rather than adding hydrogen sulphide to the oxidizing gas as herein described. Such a process is more fully described and claimed in our copending application Serial No. 30,355.

It will be obvious to one skilled in the art that many modifications of the several steps comprised in this general process may be effected to meet individual circumstances or requirements without materially affecting the reactions involved and hence without departing from our invention. The several steps may, for instance, be operated either continuously or stepwise and many available forms of apparatus may be employed in each. Even the final product may be changed from pentasulphide to thiosulphate by employing the proper catalyst as described herein without departing from the scope of the invention.

It will also be obvious that since the oxidation process described leads, in the several modifications contemplated, to substantially a single oxidation product the concentration of that product in the final solution may be predetermined by a proper regulation of the ratio of base to water employed in preparing any particular hydrosulphide solution for oxidation.

While the examples given have been confined to the oxidation of calcium hydrosulphide solutions the reaction is general with respect to the hydrosulphide ion and might therefore be equally well employed with other water-soluble hydrosulphides. Other of the metal sulphides discussed may also be employed under proper conditions with results equal to those herein reported with nickel sulphide catalyst. Similarly the pressure and temperature at which the oxidation is effected need not be confined to substantially atmospheric as herein employed though the advantages to be gained from considerably more extreme conditions will usually not warrant the added hazard and expense.

Having now described a novel and useful process for the controlled and directed oxidation of solutions containing hydrosulphide sulphur, what we claim is:

1. A process for the catalytic oxidation of hydrosulphide solutions to pentasulphide by means of an oxygen containing gas and a water insoluble multivalent metal sulphide catalyst effective in promoting such oxidation wherein the solution is maintained substantially saturated with hydrogen sulphide at a partial pressure of at least 0.001 atmosphere during the oxidation.

2. A process for the catalytic oxidation of hydrosulphide solutions as in claim 1 wherein hydrogen sulphide is provided in sufficient amount that the exit gas leaving the process will contain at least 0.1% H₂S.

3. A process for the catalytic oxidation of hydrosulphide solutions as in claim 1 wherein the catalyst is a sulphide of a metal selected from the group consisting of nickel, iron, cobalt, copper.

4. A process for the catalytic oxidation of hydrosulphide solutions to pentasulphide by means of an oxygen containing gas and a water insoluble multivalent metal sulphide catalyst effective in promoting such oxidation wherein the solution is maintained substantially saturated with hydrogen sulphide at a partial pressure of at least 0.001 atmosphere and the oxidation is discontinued at the point at which free sulphur begins to be liberated.

5. A process for the catalytic oxidation of hydrosulphide solutions as in claim 4 wherein hydrogen sulphide is provided in sufficient amount that the exit gas leaving the process will contain at least 0.1% H₂S.

6. A process for the catalytic oxidation of calcium hydrosulphide solutions to pentasulphide by means of an oxygen containing gas and a water insoluble multivalent metal sulphide catalyst effective in promoting such oxidation wherein the pH of the solution is maintained substantially constant by keeping the solution saturated with hydrogen sulphide at a partial pressure of at least 0.001 atmosphere absolute.

7. A process for the catalytic oxidation of calcium hydrosulphide solutions as in claim 6 wherein the catalyst is a sulphide of a metal selected from the group consisting of nickel, iron, cobalt, and copper.

8. A process for the catalytic oxidation of calcium hydrosulphide solutions as in claim 6 wherein hydrogen sulphide is introduced in amount sufficient to maintain equilibrium with the solution at a partial pressure of about 0.005 atmosphere absolute and the catalyst is nickel sulphide.

WILLIAM H. SHIFFLER.
MELVIN M. HOLM.